United States Patent [19]

Senuma et al.

[11] Patent Number: 5,296,534
[45] Date of Patent: Mar. 22, 1994

[54] FLAME RETARDANT COMPOSITION

[75] Inventors: Akitaka Senuma; Nobuo Yasuda, both of Yokohama; Isao Noda, Yokosuka, all of Japan

[73] Assignee: Nippon Unicar Company Limited, Tokyo, Japan

[21] Appl. No.: 2,631

[22] Filed: Jan. 11, 1993

[30] Foreign Application Priority Data

Jan. 16, 1992 [JP] Japan .................. 4-25744
Jan. 20, 1992 [JP] Japan .................. 4-31601

[51] Int. Cl.$^5$ .................. C08K 3/22
[52] U.S. Cl. .................. 524/436; 525/72; 525/106
[58] Field of Search .................. 524/436; 525/72, 106

[56] References Cited

U.S. PATENT DOCUMENTS

| | | | |
|---|---|---|---|
| 4,067,847 | 1/1978 | Yui et al. | 260/45.7 R |
| 4,098,762 | 7/1978 | Miyata et al. | 524/162 |
| 4,535,106 | 8/1985 | Abolins et al. | 525/106 |
| 4,560,719 | 12/1985 | Nakamura et al. | 524/436 |
| 4,618,654 | 10/1986 | Schmidtchen et al. | 525/72 |
| 4,622,350 | 11/1986 | Icenogle et al. | 523/200 |
| 4,732,939 | 3/1988 | Hoshi et al. | 524/436 |
| 4,783,504 | 11/1988 | St. Clair et al. | 525/72 |
| 4,801,639 | 1/1989 | Hoshi et al. | 524/436 |
| 4,913,965 | 4/1990 | Keogh | 524/436 |
| 4,921,916 | 5/1990 | Howell et al. | 524/436 |
| 4,975,486 | 12/1990 | Kasahari et al. | 525/75 |
| 5,002,996 | 3/1991 | Okuda et al. | 524/436 |
| 5,132,350 | 7/1992 | Keogh | 524/436 |

FOREIGN PATENT DOCUMENTS 61-9401 8/1981 Japan .

Primary Examiner—Veronica P. Hoke
Attorney, Agent, or Firm—Saul R. Bresch

[57] ABSTRACT

A flame retardant composition comprising:
(i) a thermoplastic resin;
(ii) magnesium hydroxide; and
(iii) an organopolysiloxane modified styrene elastomer.

7 Claims, No Drawings

FLAME RETARDANT COMPOSITION

TECHNICAL FIELD

This invention relates to flame retardant compositions containing thermoplastic resins and a magnesium hydroxide filler. The compositions are particularly useful as insulation for wire and cable.

BACKGROUND ART

Thermoplastic resins, which have good electrical insulation characteristics, are widely used to provide insulating jacketing or sheaths for wire and cable. Recently, there has been a demand for improved flame retardant properties, e.g., as high as V-1 to V-0 using Underwriters Laboratories standards.

Thermoplastic resin can be made flame retardant by adding to the resin organic halides or antimony oxides, for example, or the resin itself can be halogenated to provide polymers such as polyvinyl chloride or chlorinated polyethylene. These thermoplastic resins, however, on burning, drip, sag, and emit large amounts of smoke and other harmful gases, and also corrode metals.

In order to solve these problems, it has been proposed to add metal hydroxides to non-halogenated thermoplastic resins. Aluminum hydroxide was first used because of its low cost, but it has such a low decomposition temperature (170° to 190° C.) that the aluminum hydroxide decomposes, generating water, which, in turn, causes foaming on interior surfaces. Furthermore, to obtain a flame retardance of V-1 to V-0, aluminum hydroxide has to be added to the thermoplastic resin in amounts of as much as 60 to 65 percent by weight based on the weight of the total composition.

Compared with aluminum hydroxide, magnesium hydroxide has a much higher decomposition temperature (about 360° C.), and, thus, exhibits less foaming. For this reason, and others, magnesium hydroxide has been widely used as a flame retardant in resins. One disadvantage of a thermoplastic resin/magnesium hydroxide flame retardant composition, however, is that the magnesium hydroxide absorbs carbon dioxide from high humidity, high temperature atmospheres such as the atmosphere found in a cable tunnel. This results in the formation of magnesium hydroxycarbonate ($MgCO_3 \cdot Mg(OH)_2$), a white substance, on, for example, the surface of a wire or cable jacket. This "whitening" not only detracts from the appearance of the jacket, but also has a degrading effect insofar as arc resistance, insulation, mechanical, low temperature brittleness, and other properties are concerned.

Magnesium hydroxide is also not conducive to good moldability. When combined with a thermoplastic resin, poor flammability, slow molding speed, rough surfaces, and lower electrical and mechanical properties can be the result.

DISCLOSURE OF INVENTION

An object of this invention, therefore, is to provide a composition, which, in a formed state, will not be susceptible to whitening caused by the chemical reaction of magnesium hydroxide, carbon dioxide, and water, and will exhibit good moldability and sufficient flame resistance.

Other objects and advantages will become apparent hereafter.

According to the invention, a composition has been discovered which meets the above objective. The composition comprises
(i) a thermoplastic resin;
(ii) magnesium hydroxide; and
(iii) an organopolysiloxane modified styrene elastomer.

DETAILED DESCRIPTION

The thermoplastic resin can be any homopolymer or copolymer produced from two or more comonomers, or a blend of two or more of these polymers, conventionally used as jacketing and/or insulating materials in wire and cable applications. Generally, the monomers useful in the production of these homopolymers and copolymers will have 2 to 20 carbon atoms. Examples of such monomers are alpha-olefins such as ethylene, propylene, 1-butene, 1-hexene, 4-methyl-1-pentene, and 1-octene; unsaturated esters such as vinyl acetate, ethyl acrylate, methyl acrylate, methyl methacrylate, t-butyl acrylate, n-butyl acrylate, n-butyl methacrylate, 2-ethylhexyl acrylate, and other alkyl acrylates; diolefins such as 1,4-pentadiene, 1,3-hexadiene, 1,5-hexadiene, 1,4-octadiene, and ethylidene norbornene; other monomers such as styrene, p-methyl styrene, alphamethyl styrene, vinyl naphthalene, and similar aryl olefins; nitriles such as acrylonitrile and methacrylonitrile; vinyl methyl ketone, vinyl methyl ether, and maleic anhydride; and acrylic acid, methacrylic acid, and other similar unsaturated acids. In addition to polyolefins, included among the polymers can be polyesters, polycarbonates, and polyurethanes. The homopolymers and copolymers of ethylene are preferred. The resins are preferably non-halogenated.

Examples of homopolymers and copolymers of ethylene are high pressure, low density polyethylene; polyethylenes of various densities (high, medium, linear low, very low, and ultra-low) wherein the comonomer is 1-butene, 1-hexene, 4-methyl-1-pentene, or 1-octene; ethylene/propylene rubber; ethylene/propylene/diene monomer rubber; ethylene/vinyl acetate copolymer; ethylene/ethyl acrylate copolymer; isobutylene/isoprene rubber and polybutene-1. Preferred densities are in the range of about 0.860 to 0.915 gram per cubic centimeter.

While conventional magnesium hydroxides can be used, a particularly preferred magnesium hydroxide and a method for its preparation are described in U.S. Pat. No. 4,098,762. Preferred characteristics for this magnesium hydroxide are (a) a strain in the <101> direction of no more than $3.0 \times 10^{-3}$; (b) a crystallite size in the <101> direction of more than 800 angstroms; and (c) a surface area, determined by the BET method, of less than 20 square meters per gram.

The average particle diameter of the magnesium hydroxide can be in the range of about 0.1 to about 15 microns and is preferably in the range of about 0.5 to about 3 microns. The surface area can be about 1 to about 20 square meters per gram and is preferably about 3 to about 8 square meters per gram.

The magnesium hydroxide is preferably surface treated with a saturated or unsaturated carboxylic acid having about 8 to about 24 carbon atoms and preferably about 12 to about 18 carbon atoms or a metal salt thereof. Mixtures of these acids and/or salts can be used, if desired. Examples of suitable carboxylic acids are oleic, stearic, palmitic, isostearic, and lauric; of metals which can be used to form the salts of these acids are zinc, aluminum, sodium, calcium, magnesium, and barium; and of the salts themselves are magnesium stearate, zinc oleate, sodium oleate, sodium stearate, sodium lauryl sulfonate, calcium stearate, zinc stearate, calcium palmitate, magnesium oleate, and aluminum stearate. The amount of acid or salt can be in the range of about 0.1 to about 5 parts by weight of acid and/or salt per one hundred parts by weight of metal hydrate and preferably about 0.25 to about 3 parts by weight per one hundred parts by weight of metal hydrate. The acid or salt can be merely added to the composition in like amounts rather than using the surface treatment procedure, but this is not preferred.

The proportions of components in subject composition based on 100 parts by weight of thermoplastic resin are about as follows:

|  | Broad Range | Preferred Range |
|---|---|---|
|  | (parts by weight) |  |
| Magnesium hydroxide | 5 to 450 | 100 to 250 |
| Organopolysiloxane modified styrene elastomer | 1 to 80 | 30 to 60 |

The weight ratio of magnesium hydroxide to the modified styrene elastomer can be in the range of about 0.06:1 to about 450:1 and is preferably in the range of about 1.7:1 to about 8.3:1.

The styrene elastomers include styrene-butadiene rubbers (a copolymer of styrene and butadiene); styrene-isoprene copolymers; styrene-isoprene-styrene block copolymers; styrene-butadiene-styrene block copolymers; alpha-methylstyrene-isoprene-alpha-methylstyrene block copolymers; styrene-butadiene block copolymers; styrene-isoprene block copolymers; alpha-methylstyrene-butadiene copolymers; alpha-methylstyrene-isoprene copolymers; alpha-methylstyrene-butadiene-alpha-methylstyrene block copolymers; and styrene-butadiene-isoprene block copolymers. A preferred styrene elastomer is a styrene-ethylene/butylene-styrene triblock copolymer. All of the styrene elastomers are thermoplastic rubbers and are based on about 30 to about 70 percent by weight styrene or alpha-methyl styrene with the balance being, for example, butadiene, isoprene, or ethylene/butylene copolymer. The elastomers can be linear, diblock, triblock, or graft copolymers.

The molecular weight of the styrene elastomer is generally in the range of about 50,000 to about 200,000 and is preferably in the range of about 80,000 to about 150,000. Other characteristics of the styrene elastomer are as follows: the density of the elastomer can range from about 0.880 to about 0.960 gram per cubic centimeter and the melt index from about 1 to about 10 grams per 10 minutes measured at 230° C. under a 2.16 kilogram load. Flow indices are in the range of about 30 to about 300 grams per 10 minutes measured at 230° C. under a 21.6 kilogram load.

In the styrene-ethylene/butylene-styrene triblock copolymer, polystyrene provides the two end blocks and poly(ethylene/butylene) provides the midblock. The triblock copolymer can be based on about 13 to about 37 percent by weight styrene and about 67 to about 87 percent by weight of a mixture of ethylene and butylene. The midblock can be saturated or unsaturated.

The organopolysiloxane used to modify the styrene elastomer can contain unsaturated or saturated aliphatic groups, and can also contain aromatic groups. The unsaturated groups can be present in one or more of the siloxane recurring units, which can be a methyl vinyl siloxane or another alkyl alkenyl siloxane. These units can be present in the organopolysiloxane in an amount of at least about 0.5 percent based on the weight of the organopolysiloxane.

The organopolysiloxane can also have a plasticity in the range of about 30 to about 750 degrees. The term "plasticity" is defined as 100 times the deformed height in millimeters at 70° C. for 10 minutes. It is determined under ASTM D-926 (parallel plate).

The unsaturated groups are exemplified by vinyl, allyl, acryl, and methacryl. The organopolysiloxane can also contain radicals such as halogen, cyano, and mercapto. The groups or radicals can be the same or different, and the molecular structure of the organopolysiloxane can be linear or cyclic and can contain straight or branched chains. A linear structure is preferred. The number of siloxane units in the organopolysiloxane can be in the range of about 10 to about 10,000; is preferably in the range of about 100 to about 1000; and more preferably is at least about 250. The viscosity of the organopolysiloxane can be at least about 10 centistokes at 23° C. and is preferably in the range of about 1000 to about 1,000,000 centistokes at 23° C. Viscosity is measured by using a Cannon-Fenske TM capillary viscometer according to ASTM D-445-61. When the viscosity is less than about 10 centistokes, there is a tendency towards exudation on the surface of the resulting foam. Preferred organopolysiloxanes are silicone gum and silicone oil.

One formula for a suitable organopolysiloxane can be written as follows:

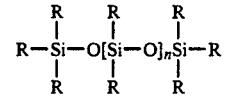

wherein R is hydrogen or an unsubstituted or substituted monovalent hydrocarbyl radical; each R is the same or different; and n is at least about 10.

A preferred organopolysiloxane can have the following recurring unit:

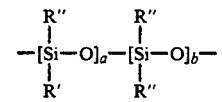

wherein R' is a monovalent unsaturated aliphatic group; R" is an unsubstituted or substituted monovalent saturated aliphatic or aromatic group; each R" is the same or different; 9 < or equal to a < 1; 0.5 < b < 3; and 1 < a + b < 3. The subscript a is preferably about 0.0004 to about 0.06. The subscript b is preferably about 1 to about 2. R' can be vinyl or other alkenyl group having 2 to 10 carbon atoms and R" can be an alkyl such as methyl, ethyl, or propyl; an aryl such as phenyl or tolyl; or a cycloalkyl such as cyclohexyl or cyclobutyl. Substituents are exemplified by halogen, cyano, and mercapto radicals.

An example of a specific recurring unit wherein a+b=2; a=0.1; and b=1.9 follows:

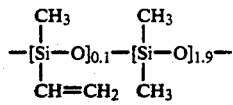

The modification of the styrene elastomer with the organopolysiloxane is accomplished with an organic peroxide, which preferably has a decomposition temperature in the range of about 100° to about 220° C. and about a 10 minute half life. Suitable organic peroxides are as follows (the decomposition temperature in °C. is given in parentheses):

Succinic acid peroxide (110), benzoyl peroxide (110), t-butyl peroxy-2-ethylhexanoate (113), p-chlorobenzoyl peroxide (115), t-butyl peroxyisobutyrate (115), t-butyl peroxyisopropyl carbonate (135), t-butyl peroxylaurate (140), 2,5-dimethyl-2,5-di(benzoyl peroxy)hexane (140), t-butyl peroxyacetate (140), di-t-butyl peroxyphthalate (140), t-butyl peroxymaleate (140) cyclohexanone peroxide (145), t-butyl peroxybenzoate (145), dicumyl peroxide (150), 2,5-dimethyl-2,5-di(t-butyl peroxy)hexane (155), t-butyl cumyl peroxy (155), t-butyl hydroperoxide (158), di-t-butyl peroxide (160), 2,5-dimethyl-2,5-di(t-butyl peroxy)hexene-3 (170), di-isopropylbenzene hydroperoxide (170), p-methane hydroperoxide (180), and 2,5-dimethyl hexane-2,5-hydroperoxide (213).

For each 100 parts by weight of thermoplastic resin, the proportions of organopolysiloxane and organic peroxide are about as follows:

| Component | Parts by Weight broad | preferred |
|---|---|---|
| (ii) organopolysiloxane | 0.1 to 450 | 3 to 20 |
| (iii) organic peroxide | 0.001 to 15 | 0.1 to 2 |

The components are heat-kneaded together at a temperature of about 160° C. to about 200° C., in kneading apparatus such as a Banbury ™ mixer or a twin-screw extruder. The heat-kneading is continued until the melt index of the combination is in the range of about 0.05 to about 5 grams per 10 minutes.

The composition adapted to provide the composition of the invention, which includes a styrene elastomer modified with an organopolysiloxane, comprises:
(1) a thermoplastic resin;
(ii) magnesium hydroxide;
(iii) an organopolysiloxane;
(iv) a styrene elastomer; and
(v) an organic peroxide Commercial embodiments of the composition of the invention are generally obtained by mixing together the above-mentioned components with one or more antioxidants and other additives in apparatus such as a Banbury mixer, a pressure kneader, a twin screw extruder, a Buss co-kneader, a Henschel mixer, or a roll kneader at temperatures in the range of about 160° C. to about 200° C. The result is that the styrene elastomer is modified by the organopolysiloxane, which grafts thereto. The components can be added in any order and the components used in smaller amounts can be added via a masterbatch. The mixtures can then be extruded or subjected to injection molding, rotational molding, or compression molding.

Useful additives for the composition of the invention are antioxidants, surfactants, reinforcing filler or polymer additives, crosslinking agents, ultraviolet stabilizers, antistatic agents, pigments, dyes, slip agents, plasticizers, lubricants, viscosity control agents, extender oils, metal deactivators, water tree growth retardants, voltage stabilizers, flame retardant additives, and smoke suppressants.

Examples of antioxidants are: hindered phenols such as tetrakis[methylene (3,5-di-tert-butyl-4-hydroxyhydrocinnamate)]methane and thiodiethylene bis(3,5-di-tert-butyl-4-hydroxy)hydrocinnamate; phosphites and phosphonites such as tris(2,4-di-tert-butylphenyl) phosphite and di-tert-butylphenylphosphonite; various amines such as polymerized 2,2,4-trimethyl-1,2-dihydroquinoline; and silica. Antioxidants are used in amounts of about 1 to about 5 parts by weight per hundred parts by weight of thermoplastic resin.

The patent mentioned in this specification is incorporated by reference herein.

The invention is illustrated by the following examples.

EXAMPLES

In the examples, the performance of the composition of the invention is evaluated by using a dumbbell specimen cut out of a sheet formed by compression molding the composition. The degree of whitening is determined by measuring the weight increase of a specimen exposed to a carbon dioxide gas stream containing moisture. The exposure is effected in a glass chamber having a volume of 50 cubic centimeters. The carbon dioxide is introduced into the chamber after bubbling through water at room temperature to provide a gas stream having a relative humidity higher than 90 percent.

Moldability is determined in terms of melt index and melt flow index. The melt index is measured at 190° C. under a loading of 2.16 kilograms and the melt flow index is measured at 190° C. under a loading of 21.6 kilograms, both in accordance with JIS (Japanese Industrial Standard) K-6760. Moldability is considered good when the melt index is 0.1 gram per 10 minutes or greater and the melt flow index is 30 grams per 10 minutes or greater.

Flame retardance is determined in terms of oxygen index in accordance with JIS K-7210. Flame retardance is considered sufficient if the oxygen index is 31 or greater.

EXAMPLE 1

40 parts by weight of silicone gum containing 0.8 percent by weight methyl vinyl siloxane and having a plasticity of 80 degrees; 100 parts by weight styrene-ethylene/butylene-styrene triblock copolymer (SEBS); and 0.07 part by weight 1,3-di(t-butyl peroxy isopropyl)benzene (organic peroxide) are kneaded at 180° C. for 10 minutes to obtain an organopolysiloxane modified styrene elastomer. 100 parts by weight of a high pressure low density polyethylene; 200 parts by weight of magnesium hydroxide coated with stearic acid; 0.5 part by weight of an antioxidant; 2.5 parts by weight of carbon black; and 15 parts by weight of the organopolysiloxane modified styrene elastomer prepared above are kneaded at 170° C. for 10 minutes in a Banbury ™ mixer.

The antioxident is tetrakis[methylene (3,5-di-tert-butyl-4-hydroxyhydrocinnamate)]methane.

The resulting kneaded mixture has a melt index of 0.12 g/10 min and a melt flow index of 38 g/10 min and has good moldability.

The kneaded mixture is pelletized, and the pellets are formed into a sheet, one millimeter thick, 150 millimeters in length, and 180 millimeters in width at 150° C. and 100 kilograms per square centimeter for 3 minutes. A dumbbell sample is provided out of the sheet for the whitening test described above.

The sample takes 19 days to increase its weight by one percent; the longer the period of time the better. The results of the accelerated test suggest that it will take 3500 days (over nine years) for the sample to incur the same weight increase when exposed to a normal atmosphere containing 0.03 percent by weight carbon dioxide. Thus, it can be said that the subject composition has sufficient resistance to whitening caused by carbon dioxide gas for commercial applications.

In a visual test, it took 10 days before a white substance appeared on the surface of the sample, and 23 days before the surface of the sample was completely white. These periods in the accelerated test translate into 800 days and 3800 days, respectively, in a normal atmosphere containing 0.3 percent by weight carbon dioxide.

The oxygen index is 34. Thus, the sample has sufficient flame retardance.

EXAMPLE 2

Example 1 is repeated except that 30 parts by weight of the modified styrene elastomer are used.

The resulting kneaded mixture has a melt index of 0.18 g/10 min and a melt flow index of 48 g/10 min and has good moldability.

The sample takes 17 days to increase its weight by one percent.

The oxygen index is 35.

EXAMPLE 3

Example 2 is repeated except that a linear very low density polyethylene is used instead of the high pressure low density polyethylene.

The resulting kneaded mixture has a melt index of 0.13 g/10 min and a melt flow index of 29 g/10 min, and has good moldability.

The sample takes 15 days to increase its weight by one percent.

The oxygen index is 35.

EXAMPLE 4

This is a comparative example.

Example 1 is repeated except that the modified styrene elastomer is omitted.

The resulting kneaded mixture has a melt index of 0.08 g/10 min and a melt flow index of 17 g/10 min, and poor moldability.

The sample takes 6 days to increase its weight by one percent.

The oxygen index is 33.

EXAMPLE 5

This is a comparative example.

Example 3 is repeated except that the modified styrene elastomer is omitted. The resulting kneaded mixture has a melt index of 0.09 g/10 min and a melt flow index of 13, and has poor moldability.

The sample takes 9 days to increase its weight by one percent.

The oxygen index is 33.

EXAMPLE 6

Example 1 is repeated except that the modified styrene elastomer is not prepared initially.

Instead, it is prepared in the second kneading step. To the polyethylene, coated magnesium hydroxide, antioxidant, and carbon black are added 11 parts by weight SEBS; 5 parts by weight of the silicone gum; and 0.15 parts by weight of the organic peroxide, and the second kneading step is effected.

The resulting kneaded mixture has a melt index of 0.16 g/10 min. and a melt flow index of 37 g/10 min, and has good moldability.

The whitening results and the oxygen index are the same as in Example 1.

EXAMPLE 7

Example 6 is repeated except that 100 parts by weight of the coated magnesium hydroxide; 22 parts by weight of SEBS; and 10 parts by weight of silicone gum are used.

The resulting kneaded mixture has a melt index of 0.23 g/10 min and a melt flow index of 47 g/10 min, and has good moldability.

The sample takes 18 days to increase its weight by one percent. In a visual test, it takes 9 days before a white substance appears on the surface of the sample and 22 days before the surface of the sample is completely white.

The oxygen index is 35.

EXAMPLE 8

Example 6 is repeated except that a low pressure low density polyethylene is substituted for the high pressure low density polyethylene.

The resulting kneaded mixture has a melt index of 0.16 g/10 min and a melt flow index of 30 g/10 min.

The sample takes 16 days to increase its weight by one percent. In a visual test, it takes 8 days before a white substance appears on the surface of the sample and 18 days before the surface of the sample is completely white.

The oxygen index is 34.

EXAMPLE 9

This is a comparative example.

Example 6 is repeated except that the SEBS, the silicone gum, and the organic peroxide are omitted.

The resulting kneaded mixture has a melt index of 0.08 g/10 min and a melt flow index of 17 g/10 min, and has poor moldability.

The oxygen index is 33.

EXAMPLE 10

This is a comparative example.

Example 6 is repeated except that 16 parts by weight of SEBS is used, and the silicone gum and organic peroxide are omitted.

The resulting kneaded mixture has a melt index of 0.16 g/10 min and a melt flow index of 37 g/min, and has good moldability.

The oxygen index is 30, and the sample shows insufficient flame retardance.

EXAMPLE 11

This is a comparative example.

Example 8 is repeated except that the SEBS, silicone gum, and the organic peroxide are omitted.

The resulting kneaded mixture has a melt index of 0.09 g/10 min and a melt flow index of 13 g/10 min, and has poor moldability.

The oxygen index is 33.

We claim:

1. A composition comprising:
   (i) a thermoplastic resin;
   (ii) magnesium hydroxide; and
   (iii) a styrene elastomer having an organopolysiloxane grafted thereto
   wherein for each 100 parts by weight of thermoplastic resin, the other components are present in about the following amounts:

| Component | Parts by weight |
| --- | --- |
| magnesium hydroxide | 5 to 450 |
| organopolysiloxane grafted styrene elastomer | 1 to 80 |

2. A composition comprising:
   (i) a thermoplastic resin;
   (ii) magnesium hydroxide;
   (iii) an organopolysiloxane;
   (iv) a styrene elastomer; and
   (v) an organic peroxide wherein for each 100 parts by weight of thermoplastic resin, the other components are present in about the following amounts:

| Component | Parts by weight |
| --- | --- |
| magnesium hydroxide | 5 to 450 |
| organopolysiloxane | 0.1 to 450 |
| styrene elastomer | 1 to 450 |
| organic peroxide | 0.001 to 5 |

3. The composition defined in claim 1 wherein the styrene elastomer is a styrene-ethylene/butylene-styrene triblock copolymer.

4. The composition defined in claim 2 wherein the styrene elastomer is a styrene-ethylene/butylene-styrene triblock copolymer.

5. A composition comprising:
   (i) polyethylene; and, for each 100 parts by weight of polyethylene,
   (ii) about 5 to about 450 parts by weight of magnesium hydroxide, surface treated with a carboxylic acid or a metal salt thereof; and
   (iii) about 1 to about 80 parts by weight of a styrene-ethylene/butylene-styrene triblock copolymer having grafted thereto a silicone oil or a silicone gum.

6. The composition defined in claim 1 coated on, or extruded about, an electrical conductor or glass fibers.

7. A molded article comprising the composition defined in claim 1.

* * * * *